(12) United States Patent
Sano et al.

(10) Patent No.: US 9,053,725 B1
(45) Date of Patent: Jun. 9, 2015

(54) HIGH-SPEED RECORDING DISK DEFECT DETECTION

(71) Applicant: HGST Netherlands B.V., Amsterdam (NL)

(72) Inventors: Yuichiro Sano, Ebina (JP); Junguo Xu, Kasumigaura (JP); Yuka Morimoto, Yamato (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/468,164

(22) Filed: Aug. 25, 2014

(51) Int. Cl.
*G11B 5/55* (2006.01)
*G11B 5/60* (2006.01)

(52) U.S. Cl.
CPC ............ *G11B 5/5552* (2013.01); *G11B 5/6076* (2013.01); *G11B 5/5547* (2013.01)

(58) Field of Classification Search
CPC .. G11B 5/5552; G11B 5/5556; G11B 5/5547; G11B 5/6076; G11B 20/1889; G11B 5/4826; G11B 5/4833; G11B 5/6005; G11B 5/607
USPC ............. 360/77.02, 77.04, 78.05, 31, 60, 59, 360/235.4, 234.4, 55, 75, 125.3, 25
See application file for complete search history.

(56) References Cited

U.S. PATENT DOCUMENTS

| | | | |
|---|---|---|---|
| 6,411,458 B1 * | 6/2002 | Billings et al. .................. 360/75 |
| 7,145,745 B1 * | 12/2006 | Shepherd et al. .......... 360/77.04 |
| 7,312,941 B2 | 12/2007 | Hirano et al. |
| 8,335,053 B2 | 12/2012 | Chen et al. |
| 8,467,144 B2 * | 6/2013 | Lim et al. .................... 360/78.05 |
| 8,643,981 B2 * | 2/2014 | Natori ......................... 360/234.4 |
| 8,711,508 B2 * | 4/2014 | Kurita et al. .................... 360/55 |
| 8,773,801 B2 * | 7/2014 | Kurita et al. .................... 360/55 |
| 8,861,108 B1 * | 10/2014 | Ikeda .............................. 360/25 |
| 2012/0099218 A1 | 4/2012 | Kurita et al. |
| 2012/0120521 A1 | 5/2012 | Kurita et al. |
| 2013/0170068 A1 | 7/2013 | Natori |

FOREIGN PATENT DOCUMENTS

| EP | 0785555 A1 | 7/1997 |
|---|---|---|
| EP | 2595154 A1 | 5/2013 |

OTHER PUBLICATIONS

Y. Yuan et al., Design and Analysis of a Slider-Level Piezoelectric Sensor Array for Head-Disk Contact Detection, IEEE Transactions on Magnetics, Jun. 2013, pp. 2574-2577, vol. 49, No. 6, IEEE.
Y. Wang et al., Tribological degradation of head-disk interface in hard disk drives under accelerated wear condition, IEEE Transactions on Magnetics, Oct. 21, 2013, vol. 50, No. 3, IEEE.

* cited by examiner

*Primary Examiner* — Ali Neyzari
(74) *Attorney, Agent, or Firm* — John D. Henkhaus

(57) ABSTRACT

A hard disk drive electronic component processes a signal from a piezoelectric actuator to identify where on a disk the slider encounters a disk defect. The signal received from the piezoelectric actuator may be based on the mechanical propagation, through the suspension to the piezoelectric actuator, of an effect of slider contact with the protrusion. Further, an actuator may be commanded to systematically move the head slider across the writeable portion of the disk to map all the protrusions on the writeable portion of the disk.

18 Claims, 5 Drawing Sheets

---

PROCESS A DISK DEFECT SIGNAL FROM A PIEZOELECTRIC ACTUATOR, WHICH IS COUPLED TO A SUSPENSION AND CONFIGURED TO PROVIDE A MOMENT FORCE FOR MOVING A HEAD SLIDER, TO DETERMINE THAT THE HEAD SLIDER ENCOUNTERED A DEFECT AT A PARTICULAR LOCATION ON A DISK MEDA
602

↓

STORE AN IDENTIFIER CORRESPONDING TO THE PARTICULAR LOCATION
604

HIGH-SPEED RECORDING DISK DEFECT DETECTION

FIELD OF EMBODIMENTS

Embodiments of the invention may relate generally to hard disk drives and more particularly to recording disk defect detection.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

The nature of magnetic-recording media fabrication is such that the media typically have micro-scale defects, such as asperities and pits in the outer surface of the media. Such defects can cause errors with writing operations, and therefore also reading operations, because the data cannot always be written properly over the asperities and pits. Therefore, the disk media are typically tested at the factory during HDD manufacturing in order to identify any defective areas of the disk. However, the time currently required to run these disk defect tests is non-trivial. Further, factory process time is an important resource, so managing the use of process time is a common goal in manufacturing.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a hard disk drive (HDD) electronic component that processes a signal from a piezoelectric actuator to identify where on a disk the head slider encounters a disk defect, a corresponding HDD including such an electronic component, and a method for mapping disk media defects.

According to an embodiment, an actuator is commanded to systematically move the head slider across the writeable portion of the disk to map protrusions on the writeable portion of the disk. According to an embodiment, the processing may determine that the head slider made contact with a disk protrusion at a particular location on the disk. According to an embodiment, the signal received from the piezoelectric actuator is based on the mechanical propagation through the suspension to the piezoelectric device of an effect of the slider contact with the protrusion.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to processing a signal from a piezoelectric actuator device to identify where on a disk media a head slider encounters a disk defect, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Figure 1:
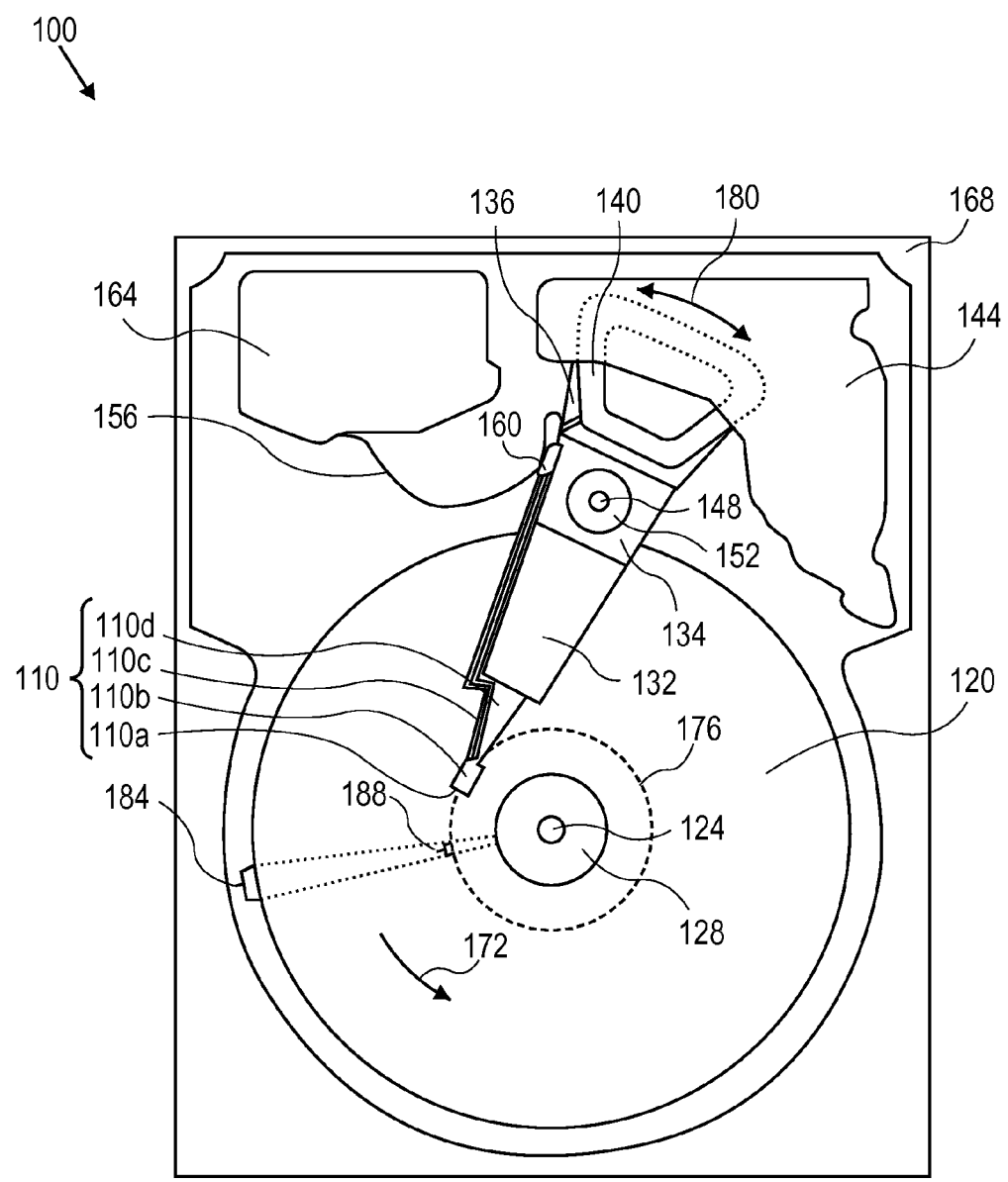
FIG. 1 is a plan view illustrating a hard disk drive, according to an embodiment of the invention.

Embodiments of the invention may be used in the context of a piezoelectric actuator and an electronic component in a hard-disk drive (HDD) storage device. Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110, to access portions of the media 120, being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Flexure Assembly

Figure 2:
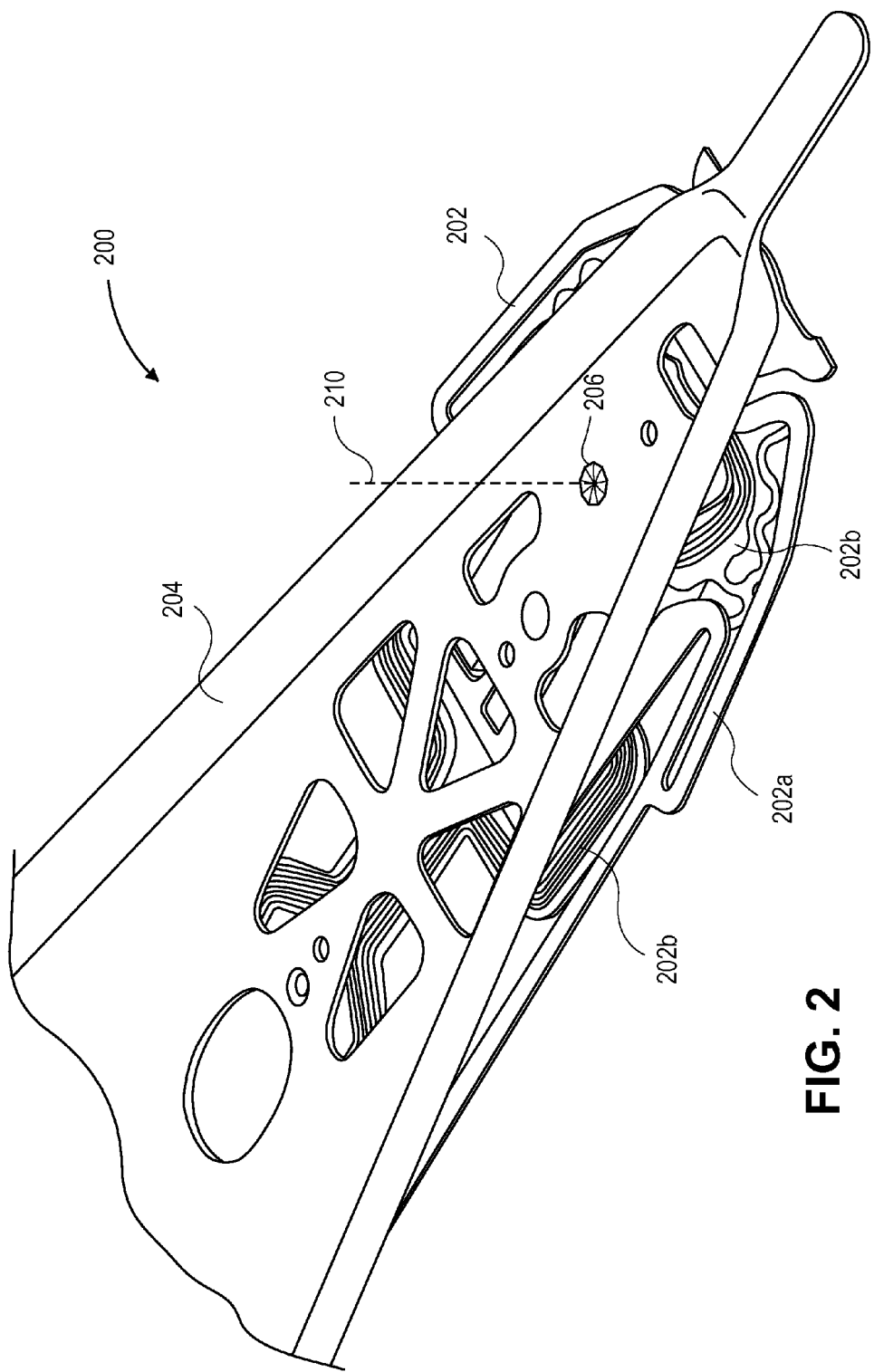
FIG. 2 is a perspective view illustrating a head gimbal assembly (HGA), according to an embodiment of the invention.

FIG. 2 is a perspective view illustrating a head gimbal assembly (HGA), according to an embodiment of the invention. An HGA may also be referred to as a flexure gimbal assembly. HGA 200 comprises a flexure 202 and a load beam 204 having a dimple 206. Flexure 202 may comprise multiple assembled layers such as a stainless steel layer 202a, or "spring layer", coupled with an insulator layer 202b. Flexure 202 may also, but need not, comprise a separate conductor layer. Flexure 202 is movably coupled to the load beam 204 via the gimbal 206 and has freedom of rotation about the dimple axis 210. Because a slider is coupled to a slider attachment platform 302 (FIG. 3) of flexure 202, the slider likewise has freedom of rotation about dimple axis 210.

Multiple-Stage Actuation

Increasing areal density (a measure of the quantity of information bits that can be stored on a given area of disk surface)

is one of the ever-present goals of hard disk drive design evolution, and has led to the necessary development and implementation of secondary and even tertiary actuators for improved head positioning through relatively fine positioning, in addition to a primary voice coil motor (VCM) actuator which provides relatively coarse positioning. Some hard disk drives employ micro- or milli-actuator designs to provide second stage actuation, via a secondary-stage actuator, of the recording head to enable more accurate positioning of the head relative to the recording track. Milli-actuators are broadly classified as actuators that move the entire front end of the suspension: spring, load beam, flexure and slider. An example of a milli-actuator system is described in more detail in reference to FIG. 4. Micro-actuators are broadly classified as actuators that move only the slider, moving it relative to the load beam, or moving the read-write element only, moving it relative to the slider body. An example of a micro-actuator ("microactuator") system is described in more detail in reference to FIG. 3. Piezoelectric (PZT) based and capacitive micro-machined transducers are two types of microactuators that have been proposed for use with HDD sliders.

Piezoelectricity is the electric charge that accumulates in certain solid materials in response to applied mechanical stress. The piezoelectric effect is a reversible process in that materials exhibiting the direct piezoelectric effect also exhibit the reverse piezoelectric effect, i.e., the internal generation of a mechanical strain resulting from an applied electrical field. This latter effect is utilized in driving piezo actuating devices to expand and contract in order to enable fine movement of the head slider.

Microactuator Assembly

Figure 3:
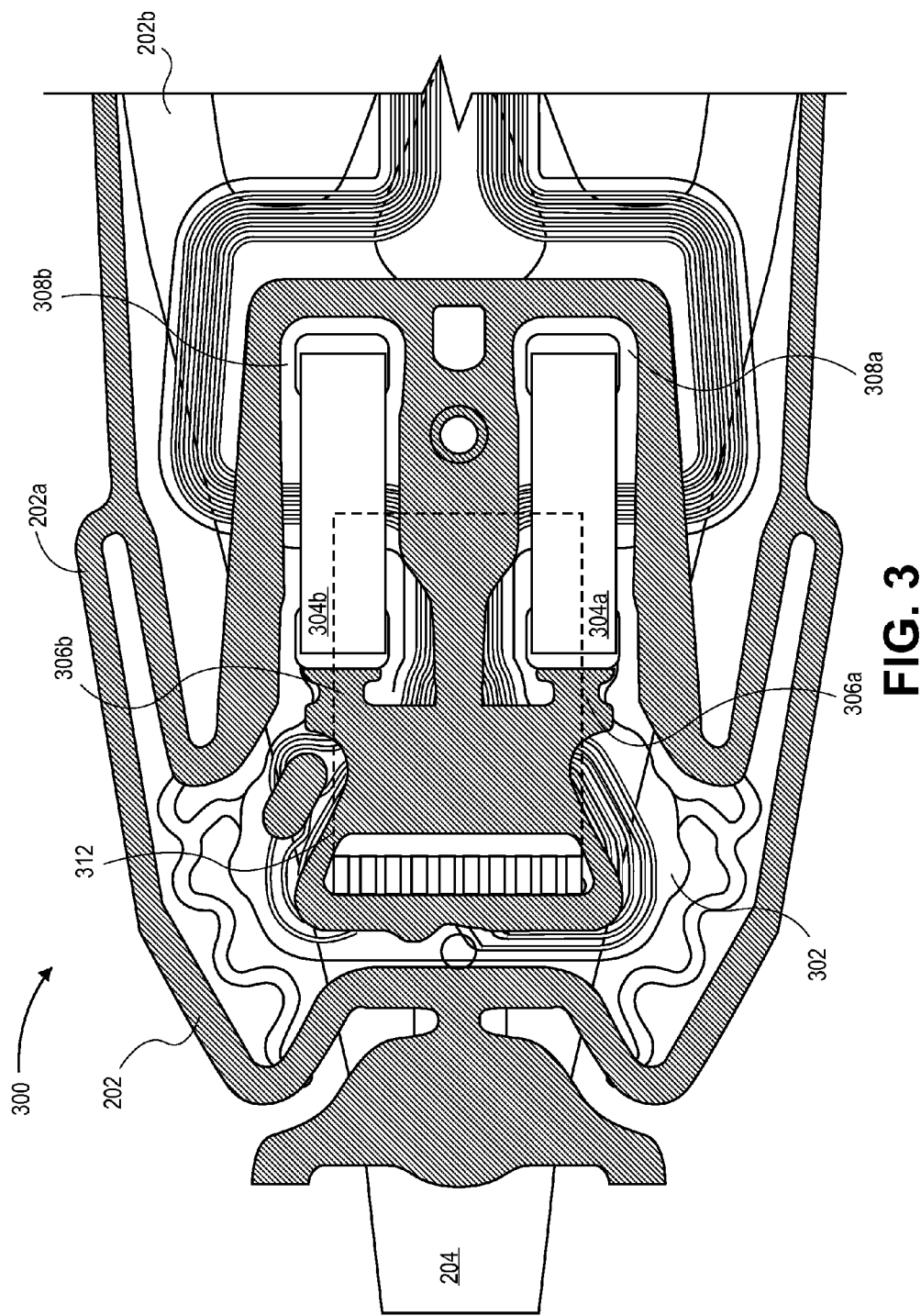
FIG. 3 is a bottom plan view illustrating a flexure gimbal assembly including a secondary stage actuator, according to an embodiment of the invention.

FIG. 3 is a bottom plan view illustrating a flexure gimbal assembly including a secondary stage actuator, according to an embodiment of the invention. Flexure gimbal assembly 300 illustrates a non-limiting example of a microactuator system, and comprises the flexure assembly 202, which may comprise the stainless steel layer 202a and the insulator layer 202b, movably coupled with load beam 204 through a dimple 206 (FIG. 2). Flexure gimbal assembly 300 further comprises a slider attachment platform 302 on which a slider 312 (such as slider 110b of FIG. 1) is attached, and a piezo actuating device 304a and a piezo actuating device 304b for fine rotation of slider 312 about an axis of rotation. According to this embodiment the slider 312 and the piezo actuating devices 304a, 304b, are located on opposing sides of flexure assembly 302.

Each piezo actuating device 304a, 304b is mounted at one end (distal end) to a respective piezo hinge 306a and piezo hinge 306b, and at the other end (proximal end) to a respective leading edge portion 308a and leading edge portion 308b, of a flexure tongue. The microactuator selectively rotates the slider 312 about the dimple axis 210 (FIG. 2). Opposite polarity voltage is applied to the two different piezo actuating devices 304a and 304b, such that one piezo expands and the other piezo contracts to rotate the slider 312 under a corresponding moment force. Piezo hinge 306a and piezo hinge 306b allow the two different piezos to simultaneously extend and contract in a linear manner, while allowing the slider attachment platform 302 and the slider 312 to rotate.

Milli-Actuator Assembly

Figure 4:
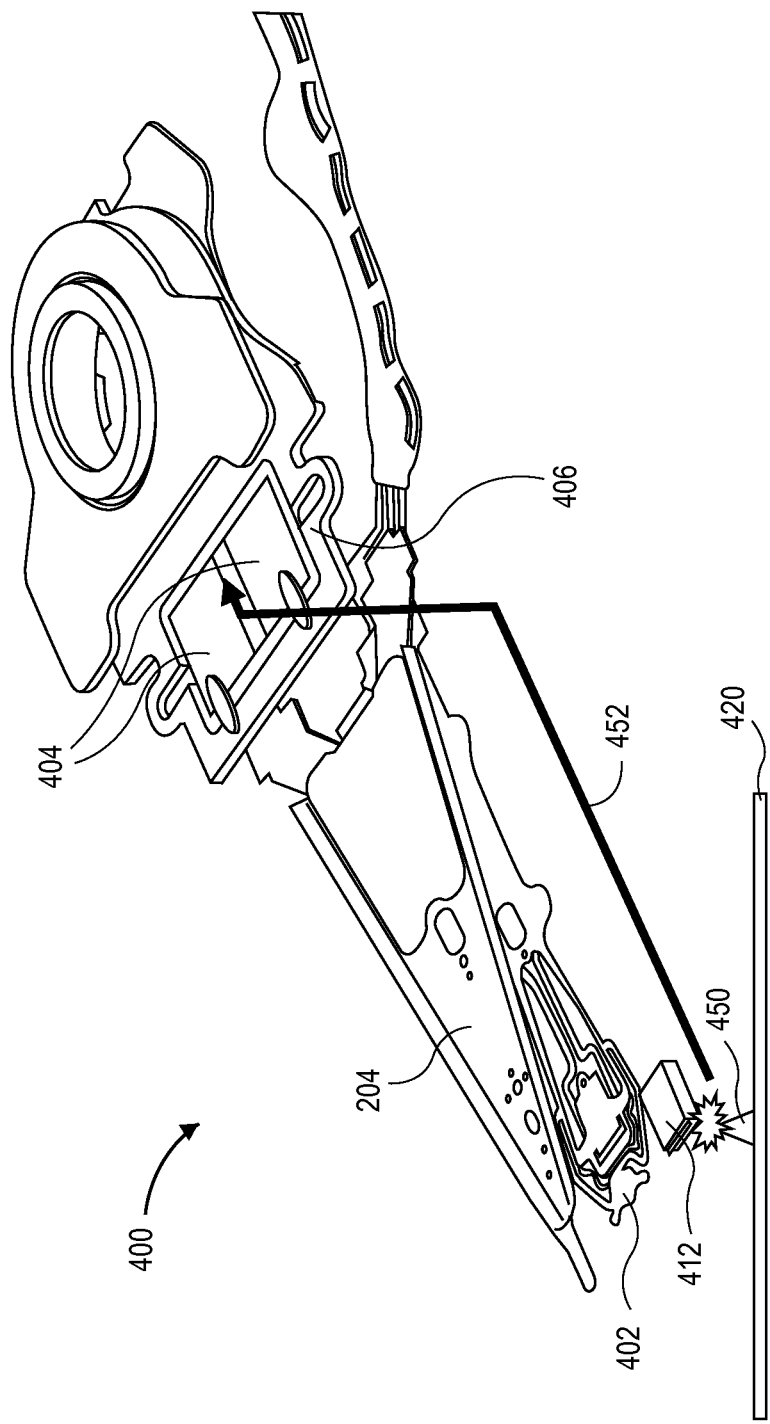
FIG. 4 is an exploded perspective view illustrating a head suspension assembly including a secondary stage actuator, according to an embodiment of the invention.

FIG. 4 is an exploded perspective view illustrating a head suspension assembly including a secondary stage actuator, according to an embodiment of the invention. Head suspension assembly 400 illustrates a non-limiting example of a milli-actuator system, and comprises a flexure assembly 402 to which a slider 412 is attached, where the flexure assembly 402 is movably coupled with load beam 204. Head suspension assembly 400 further comprises a piezo actuating device 404 at a proximal end of the head suspension assembly 400, for fine rotation of the load beam 204, flexure assembly 402 and slider 412 about an axis of rotation.

Introduction

Media defect control is an important aspect of the HDD manufacturing process, and affects product yields. As mentioned, the nature of magnetic-recording media fabrication is such that the media typically have micro-scale defects that can cause errors with writing and reading operations, and that the time currently required to run disk defect tests in the factory, such as production line glide testing, is not trivial. Further, in order to enable higher areal densities, the head disk spacing (or "flying height") is being reduced significantly such that even micro-defects challenge performance and reliability goals. Thus, managing and minimizing the time it takes to perform disk defect testing can be beneficial.

Disk Defect Detection Using Multiple-Stage Actuator System

Figures 5, 6:
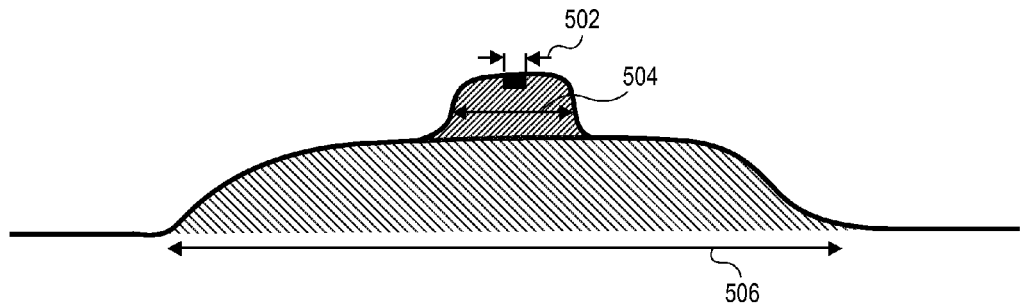
FIG. 5 is a schematic side view illustrating a head, according to an embodiment of the invention.
FIG. 6 is a flow diagram illustrating a method for mapping disk media defects, according to an embodiment of the invention.

Using the head suspension assembly of FIG. 4 as an example multiple-stage actuation system, a technique for detecting recording disk defects is described. FIG. 6 is a flow diagram illustrating a method for mapping disk media defects, according to an embodiment of the invention. The process depicted in FIG. 6 may be implemented in an electronic component such as a hard disk controller (HDC), according to an embodiment, or in an SOC, according to another embodiment. Hard-disk controllers are typically implemented as integrated circuit (IC) boards and, therefore, can be designed in many different architectures of electronic circuitry. Further, modern HDC's often take the form of a system-on-a-chip, or an "SOC". An SOC is an IC that integrates all components of an electronic system into a single chip. An SOC may contain digital, analog, mixed-signal, and other functions, all on a single chip substrate.

The process logic corresponding to the process of FIG. 6 may be implemented as analog or digital hardware circuitry within the electronic component or as firmware instructions stored in some form of memory, such as ROM, and executed by a processor, such as a CPU or an MPU, within or outside of the electronic component. The location of the processing unit(s) and the logic corresponding to the method for mapping disk media defects may vary from implementation to implementation and is not limited to implementation within any particular electronic component. Rather, the logic may be implemented in other electronic components constituent to a hard disk drive storage device besides the HDC.

At block 602, a disk defect signal from a piezoelectric actuator, which is coupled to a suspension and configured to provide a moment force for moving a head slider, is processed to determine that the head slider has encountered a defect at a particular location on a disk media. For example, with reference to FIG. 4, in response to the slider 412 encountering a defect 450 on disk media 420, an electronic component (e.g., an SOC) causes execution of one or more sequence of instructions (e.g., a program, routine, procedure, and the like) on one or more processor to process a disk defect signal from piezo actuating device 404 to determine that the slider 412 encountered the disk defect 450 at a particular location on the disk media 420.

According to an embodiment, the disk defect signal from the piezoelectric actuator is processed to determine that the head slider has encountered a protrusion (i.e., generally, an "asperity") at a particular location on the disk media. This in contrast with detecting a depression, or "pit", on the disk. According to an embodiment, the disk defect signal from the piezoelectric actuator is processed to determine that the head slider has contacted a protrusion (e.g., disk defect 450) at a particular location on the disk media (e.g., disk media 420).

As such, and according to an embodiment, the disk defect signal from the piezoelectric actuator is based on a mechanical propagation (illustrated generally as the line 452 of FIG. 4), through the suspension, associated with the head slider contact with the protrusion. For example, the head slider 412 contacting the protruding disk defect 450 causes a vibration in the coupled components, e.g., to the flexure 402 to the load beam 204 to a base plate 406 to which the piezo actuating device 404 is coupled and on to the piezo actuating device 404. As described, with a piezoelectric device an electric charge can accumulate in response to an applied mechanical stress. Therefore, the piezo actuating device 404 is capable of generating an electrical signal, i.e., the "disk defect signal", in response to the vibration that propagated from the head slider 412 through the suspension to the piezo actuating device 404 resulting from the head slider 412 contact with the disk defect 450.

At block 604, an identifier corresponding to the particular location is stored. For example, the electronic component causes to be stored, on the disk media 420, an identifier of the location of the disk defect 450 on disk media 420. HDDs typically reserve an area of the disk media for storage of such system data, the area being reserved in that the area is not able to be overwritten by user data, and such a reserved area of the disk media 450 may be used to store the location of the disk defect 450.

The process described in reference to FIG. 6 may be referred to as, and implemented into an HDD as, a disk defect mapping process. Thus, according to an embodiment, the electronic component executes and/or causes execution of one or more sequence of instructions (e.g., program code stored in a memory, such as firmware) on one or more processor to command, or drive, a voice coil motor (e.g., the VCM of FIG. 1), which operates to move the head slider across portions of the disk media, to systematically move the head slider across the entire writeable portion of the disk media (or as much of the disk media as is desirable for any particular implementation) to map the protrusions associated with the entire writeable portion of the disk media (again, or as much as is desirable). Consequently, the process of FIG. 6 may be used in HDD manufacturing instead of the glide testing technique of previous approaches. Alternatively, the process of FIG. 6 may be used to augment the glide testing technique of previous approaches. Furthermore, the process of FIG. 6 may be used any time after the HDD is placed "in the field", for example to re-map the disk defects and/or to discover and identify any new disk defects that may have occurred since the previous mapping, regardless of whether the previous mapping was performed during manufacturing or in the field.

Reducing Disk Defect Detection Test Time

Using a multiple-stage piezo actuator to identify disk defects, as described herein, likely reduces test time and improves the reliability of the head-disk interface. One reason that the test time is likely reduced is because the seek pitch can be expanded, i.e., the amount of disk area that the technique can map in a given seek profile and/or disk rotation can be increased. To understand this relative comparison, it is worthwhile to understand an example of a current technique used for mapping disk defects, which utilizes an embedded contact sensor.

Embedded Contact Sensor

Resistor temperature detector (RTD) systems have been used to determine when the slider head makes physical contact with the magnetic-recording disk based upon the temperature of an element, such as an embedded contact sensor (ECS), embedded in the slider near the read/write head. ECS elements sense physical contact of the slider with the disk based on the ECS element's resistance, e.g., the amount of voltage across the element, which is affected by the temperature change caused by such physical contact.

An ECS is a metallic strip located at the slider 110b (FIG. 1) ABS and typically in close proximity to the writer. The resistance of the ECS changes in response to temperature changes and can be used to determine touchdown, when the slider 110b temperature suddenly increases due to frictional heating with the disk 120 (FIG. 1), and to map disk 120 features such as asperities and pits according to an embodiment of the invention. Because the slider 110b does not exactly track the disk 120 topography, the distance between the ECS and the disk 120 is not constant. Because cooling of the slider 110b due to heat dissipation to the disk 120 depends on the head-disk interface (HDI) spacing, miscompliance (spacing changes) between the slider 110b and the disk 120 leads to temperature changes in the ECS, which are discernible as fluctuations in the ECS resistance. When the slider 110b flies over a disk 120 protrusion then the slider 110b heat dissipates more via thermal transfer to the disk 120 and the ECS resistance reflects the resultant decrease in temperature. Similarly, when the slider 110b flies over a disk 120 depression, or pit, then the slider 110b heat dissipates less via thermal transfer to the disk 120 and the ECS resistance reflects the resultant increase in temperature. Thus, such temperature changes reflect the disk topography, i.e., the "roughness" of the disk.

Now returning to the discussion of reducing disk defect detection test time, FIG. 5 is a schematic side view illustrating a head, according to an embodiment of the invention. FIG. 5 illustrates (1) an ECS width 502, schematically representing the width and therefore the "scan pitch" of an ECS element; (2) a "thermal fly height control" (TFC) width 504, schematically representing the width and therefore the scan pitch of a multiple-stage actuator disk defect detection system with a TFC protrusion (i.e., with TFC on); and (3) a typical head slider center pad width 506, schematically representing the width and therefore the scan pitch of a multiple-stage piezoactuator disk defect detection system without a TFC protrusion (i.e., with TFC off).

While the ECS width 502, the TFC width 504, and the center pad width 506 are illustrated to depict relative dimensionality, the illustration is not necessarily drawn to scale. However, for purposes of a non-limiting but practical example, the ECS width 502 and corresponding scan pitch may be approximately 1 μm, the TFC width 504 and corresponding scan pitch may be approximately 20 μm, and the center pad width 506 and corresponding scan pitch may be approximately 60 μm. Thus, use of a multiple-stage piezoactuator disk defect detection system with TFC on can provide a 20-fold increase in scan pitch as compared to an ECS disk defect detection system, and use of a multiple-stage piezoactuator disk defect detection system with TFC off can provide a 60-fold increase in scan pitch as compared to an ECS disk defect detection system. Consequently, a disk can be mapped correspondingly faster as compared to an ECS-based system. Additionally, use of a multiple-stage piezoactuator disk defect detection system as described herein may provide a reliability improvement because in an ECS-based system any given defect is likely contacted multiple times due to the ECS width 502, as compared with the TFC width 504 and/or the center pad width 506, with which the same defect is likely contacted only once or possibly twice due to the greater scan width associated therewith. Note that while the foregoing scenarios may be manifest benefits of using a multiple-stage piezoactuator disk defect detection system, practice of the embodiments of the invention as described herein are not required to or limited to manifestation of such benefits but are presented for purposes of example and breadth of description.

Further, even though an ECS-based disk defect mapping technique is slower than the multiple-stage piezoactuator disk defect detection, an ECS-based technique can typically detect disk pits in addition to protrusions and classify those defects as either pits or protrusions, if desirable. Thus, an implementation may include both multiple-stage piezoactuator and ECS-based disk defect detection systems. According to an embodiment, the electronic component executes and/or causes execution of one or more sequence of instructions on one or more processor to process a disk defect signal from an embedded contact sensor to determine that the head slider encountered a pit at a particular location on a disk media, and to store an identifier corresponding to the particular location of the pit.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive comprising:
   a disk media rotatably mounted on a spindle;
   a suspension comprising:
     a flexure, and
     a multiple-stage actuator comprising at least one piezo actuating device coupled to said flexure and configured to provide a moment force for moving a head slider;
   an electronic component comprising one or more sequence of instructions which, when executed by one or more processor, causes performance of:
     processing a disk defect signal from said multiple-stage actuator to determine that said head slider encountered a defect at a particular location on said disk media, and
     storing an identifier corresponding to said particular location; and
   a voice coil motor configured to move said suspension and said head slider to access portions of said disk media.

2. The hard disk drive of claim 1, wherein said processing comprises processing said disk defect signal from said multiple-stage actuator to determine that said head slider encountered a protrusion at a particular location on said disk media.

3. The hard disk drive of claim 2, wherein said processing comprises processing said disk defect signal from said multiple-stage actuator to determine that said head slider contacted said protrusion at said particular location on said disk media.

4. The hard disk drive of claim 2, wherein said processing comprises processing said disk defect signal from said multiple-stage actuator to determine that said head slider contacted said protrusion at said particular location on said disk media, and wherein said disk defect signal is based on a mechanical propagation, through said suspension, of said head slider contact with said protrusion.

5. The hard disk drive of claim 1, wherein said one or more sequence of instructions which, when executed by one or more processor, causes performance of:
   commanding said voice coil motor to systematically move said head slider across a substantially entire writeable portion of said disk media to map protrusions associated with said substantially entire writeable portion of said disk media.

6. The hard disk drive of claim 5, wherein said head slider comprises an embedded contact sensor, and wherein said one or more sequence of instructions which, when executed by one or more processor, causes performance of:
   processing a disk defect signal from said embedded contact sensor to determine that said head slider encountered a pit at a particular location on said disk media, and
   storing an identifier corresponding to said particular location of said pit.

7. A hard disk drive electronic component comprising one or more sequence of instructions which, when executed by one or more processor, causes performance of:
   processing a disk defect signal from a piezoelectric multiple-stage actuator, which is coupled to a suspension and configured to provide a moment force for moving a head slider, to determine that said head slider encountered a defect at a particular location on a disk media; and
   storing an identifier corresponding to said particular location.

8. The hard disk drive electronic component of claim 7, wherein said processing comprises processing said disk defect signal from said multiple-stage actuator to determine that said head slider encountered a protrusion at a particular location on said disk media.

9. The hard disk drive electronic component of claim 8, wherein said processing comprises processing said disk defect signal from said multiple-stage actuator to determine that said head slider contacted said protrusion at said particular location on said disk media.

10. The hard disk drive electronic component of claim 8, wherein said processing comprises processing said disk defect signal from said multiple-stage actuator to determine that said head slider contacted said protrusion at said particular location on said disk media, and wherein said disk defect signal is based on a mechanical propagation, through said suspension, of said head slider contact with said protrusion.

11. The hard disk drive electronic component of claim 7, wherein said one or more sequence of instructions which, when executed by one or more processor, causes performance of:

commanding an actuator to systematically move said head slider across a substantially entire writeable portion of said disk media to map protrusions associated with said substantially entire writeable portion of said disk media.

12. The hard disk drive electronic component of claim 11, wherein said head slider comprises an embedded contact sensor, and wherein said one or more sequence of instructions which, when executed by one or more processor, causes performance of:

processing a disk defect signal from said embedded contact sensor to determine that said head slider encountered a pit at a particular location on said disk media, and storing an identifier corresponding to said particular location of said pit.

13. A method for mapping disk media defects, the method comprising:

processing a disk defect signal from a piezoelectric multiple-stage actuator, which is coupled to a suspension and configured to provide a moment force for moving a head slider, to determine that said head slider encountered a defect at a particular location on a disk media; and storing an identifier corresponding to said particular location.

14. The method of claim 13, wherein said processing comprises processing said disk defect signal from said multiple-stage actuator to determine that said head slider encountered a protrusion at a particular location on said disk media.

15. The method of claim 14, wherein said processing comprises processing said disk defect signal from said multiple-stage actuator to determine that said head slider contacted said protrusion at said particular location on said disk media.

16. The method of claim 14, wherein said processing comprises processing said disk defect signal that is based on a mechanical propagation, through said suspension, of said head slider contact with said protrusion.

17. The method of claim 13, further comprising:

commanding an actuator to systematically move said head slider across a substantially entire writeable portion of said disk media to map protrusions associated with said substantially entire writeable portion of said disk media.

18. The method of claim 17, wherein said head slider comprises an embedded contact sensor, the method further comprising:

processing a disk defect signal from said embedded contact sensor to determine that said head slider encountered a pit at a particular location on said disk media, and storing an identifier corresponding to said particular location of said pit.

* * * * *